June 1, 1965 S. G. SHANNON 3,187,298

PIN RECEPTACLE FOR PRINTED CIRCUIT BOARD

Filed May 25, 1961 2 Sheets-Sheet 1

INVENTOR.
SUEL G. SHANNON
BY
Curtis, Morris & Safford

June 1, 1965 S. G. SHANNON 3,187,298

PIN RECEPTACLE FOR PRINTED CIRCUIT BOARD

Filed May 25, 1961 2 Sheets-Sheet 2

United States Patent Office 3,187,298
Patented June 1, 1965

3,187,298
PIN RECEPTACLE FOR PRINTED CIRCUIT BOARD

Suel G. Shannon, Harrisburg, Pa., assignor to AMP Incorporated, Harrisburg, Pa.
Filed May 25, 1961, Ser. No. 112,626
2 Claims. (Cl. 339—258)

This invention relates to pin receptacles for detachable connection with lead wires, vacuum tubes or transistor pins and the like, and more particularly to pin receptacles adapted to be set in apertures of a printed circuit board.

Various types of pin receptacles for printed circuit board use are known and have been proposed, but limited mechanical flexibility and electrical characteristics have restricted their use. The improved pin receptacle of the present invention overcomes certain well-known disadvantages of the prior constructions, and includes the features and advantages of providing a good mechanical and electrical detachable connection over a wide range of pin sizes while permitting a wide tolerance range in the circuit board apertures. Assurance is had of good mechanical and electrical engagement with the pin by providing sizable areas of contact under substantial spring pressure regardless of pin size within the design range, an important feature being that the spring elements of the receptacle are pre-loaded with an initial bias to assure, even for the smallest pin, a contact pressure above a predetermined minimum. Also, the pin receptacle of the present invention advantageously is of one-piece construction, simple and inexpensive to make by known mass-production techniques.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figures 1, 2, 3, 4, 5, 6, 7:
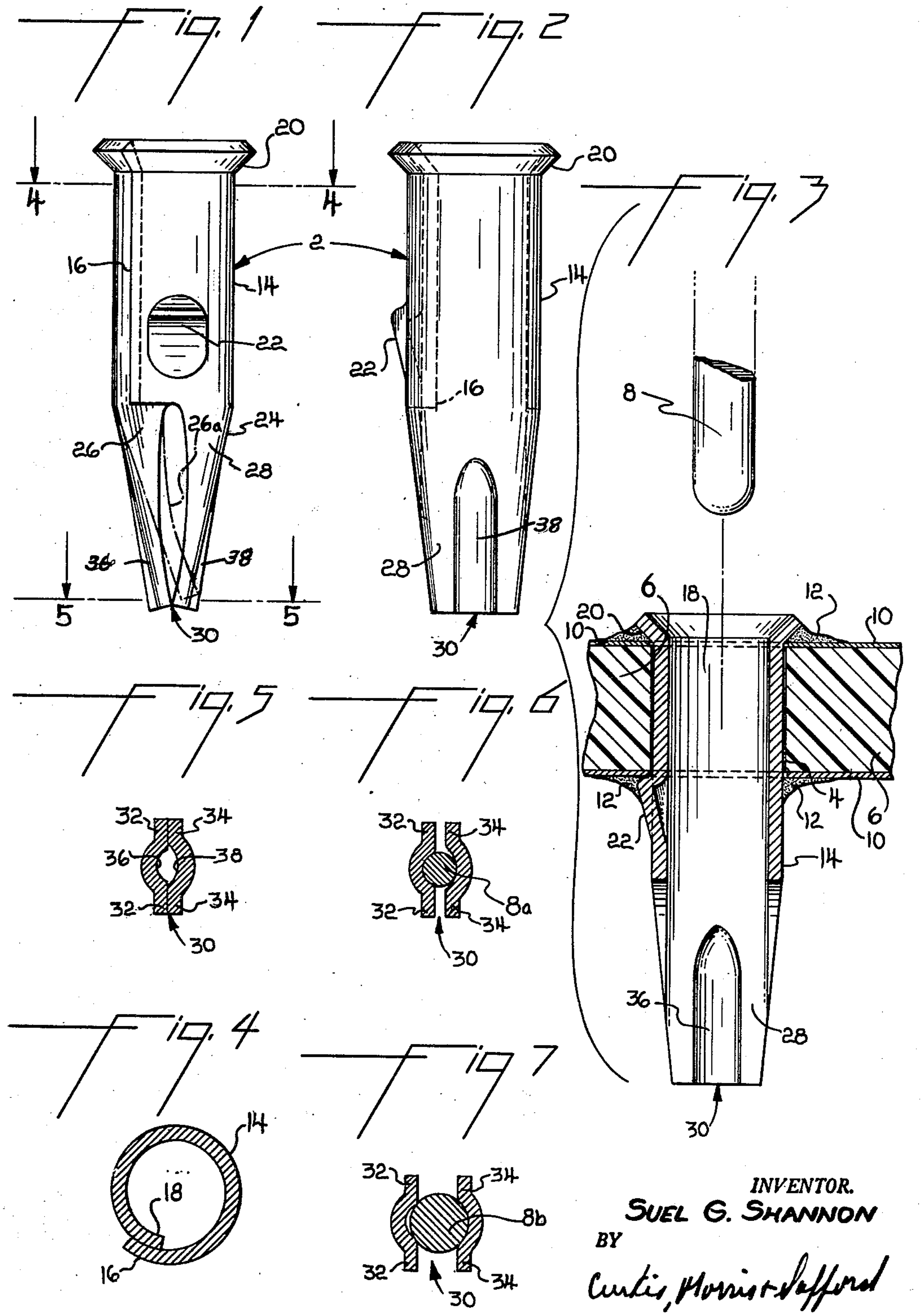
FIGURE 1 is a side view of a pin receptacle according to the present invention.
FIGURE 2 is a front view, in elevation, of the pin receptacle.
FIGURE 3 is a sectional view of the pin receptacle set and soldered in an aperture of a printed circuit board.
FIGURE 4 is a sectional view taken along lines 4—4 of FIGURE 1.
FIGURE 5 is a sectional view taken along lines 5—5 of FIGURE 1.
FIGURE 6 is a view similar to FIGURE 5 illustrating the engagement of the contact parts with a pin of minimum dimensions.
FIGURE 7 is a view similar to FIGURE 6 except that the pin size approaches the maximum diameter within the design range.

In the illustrative embodiment, the pin receptacle, generally designated at 2, in one condition of use is constructed so as to be set in an aperture 4 of a printed circuit board 6 to connect a pin 8 conductively to printed circuit strips 10 which run to the edge of aperture 4, as best shown in FIGURE 3. Circuit strips 10 may appear on either face of board 6 and are joined to pin receptacle 2 by solder fillets 12 formed and applied in accordance with practices and techniques well-known in the art.

Figure 8:
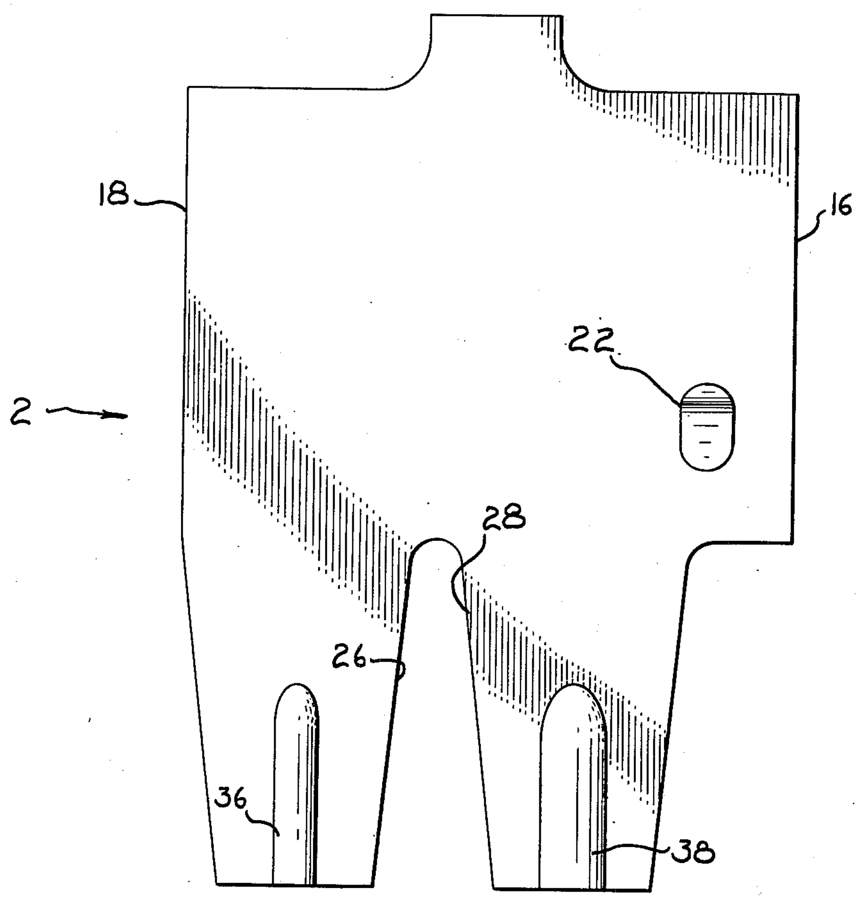
FIGURE 8 is a plan view on a reduced scale of a partially formed sheet metal blank of the pin receptacle of FIGURE 1.

It will be apparent to the skilled in the art that pin receptacle 2 can be constructed from thin-gauge, resilient sheet metal, such as tin-plated Phosphor bronze or beryllium copper, by conventional die-stamping and sheet metal forming operations. Pin receptacle 2 includes a barrel or mounting portion 14 for setting the receptacle in an aperture 4 which usually is circular; hence, barrel 14 advantageously is cylindrical and preferably rolled from a sheet metal blank, as shown in FIGURE 8.

To adapt the pin receptacle for a wide tolerance range of circuit board apertures, yet to provide a stable mechanical fit, barrel 14 is essentially a spring of such construction as to be capable of considerable resilient contraction. In the illustrative embodiment, barrel 14 thus is generally cylindrical having a relaxed diameter at least as great as the maximum aperture size and has an open seam, but with the sides 16 and 18 adjacent the seam overlapping so that they can slide past one another or roll up to the extent necessary to admit the pin receptacle into aperture 4. One end 20 of barrel 14 may be flared outwardly to provide a stop limiting insertion of the pin receptacle into aperture 4, and also a bell-mouth for facilitating insertion of the pin. Spaced from flare 20 a distance along the length of barrel 14 approximately equal to the printed circuit board thickness is a boss 22 which engages behind the bottom edge of aperture 4 as flare 20 approaches the board top surface providing a detent action, further effecting a stable setting of the pin receptacle. Alternatively, boss 22 may be spaced from flare 20 less than the thickness of the circuit board and may have a fairly sharp reverse edge thus to engage and bite into the sidewall of aperture 4.

Integrally extending from the other end of barrel 14 is a pin contact portion 24 for detachable connection with pin 8 upon insertion through barrel 14. Advantageously, pin contact portion 24 effects area engagement under significant spring pressure with pin 8 over a wide range of pin diameters. To this end, pin contact portion 24 comprises a pair of opposed spring legs 26 and 28 that converge toward one another to a tip 30. For ease of receptacle insertion, legs 26 and 28 each may also taper slightly toward tip 30, as shown in FIGURE 2. As they issue from the end of barrel 14, legs 26 and 28 generally have the same curvature of barrel 14, but gradually merge into generally flat end sections 32 and 34. To preclude any lead wire or pin 8 from snaking out through the side opening between legs 26 and 28, the legs will be spaced at their side edges a distance less than the minimum contemplated pin diameter. Extending centrally and longitudinally along legs 26 and 28 are outward embossments 36 and 38, respectively, which are transversely curved on different radii of curvature. As thus constructed, it will be apparent that the smaller embossment 36 can be curved in conformity with the surface of the smallest pin, 8*a* in FIGURE 6, contemplated to be employed in achievement of significant areas of contact; similarly, the larger embossment 38 may have a curvature consonant with the largest pin 8*b*, FIGURE 7. The difference in radii between embossments 36 and 38 will, of course, be dictated by the conditions of use, but it has been found that a radius differential of 2 to 1 suffices for ordinary purposes.

To be certain of adequate contact presure for the smaller pin sizes and limited deflections of spring legs 26 and 28, the legs preferably are pre-loaded or spring-biased toward one another so that the flat marginal sides of sections 32 and 34 will abut each other at tip 30 with positive pressure. The legs may be pre-loaded in the forming operation of the pin receptacle by bending the legs, prior to rolling barrel 14, to have a relaxed posture as indicated by the dotted lines in *26a* in FIGURE 1, wherein the end of the leg 26, for example, would move past the longitudinal axis of the pin receptacle, except for the pressure of the back pressure provided by leg 28. In this connection, the flat marginal sides of sections 32 and 34 provide bearing surfaces preventing the ends of the legs from sliding past one another, both in the initial rolling of barrel 14 and subsequent contraction thereof upon insertion of the barrel portion in an aperture of a printed circuit board. The lateral extent of embossments 36 and 38 should not be so great as to interfere with this bearing function, and preferably is less than about one-half the width of the legs at tip 30. Also, to distribute more uniformly the stresses generated by deflecting the beams defined by legs 26 and 28, embossments 36 and 38 preferably uniformly decrease in depth of indentation away from tip 30 as best shown in FIGURE 1.

I claim:

1. A pin receptacle comprising a sheet metal blank formed to define a cylindrical barrel portion having overlapping sides for resiliently fitting in an aperture of a printed circuit board, and a pair of opposed spring legs extending from one end of said barrel portion and converging to a tip to grip a pin inserted through said barrel portion, a longitudinal indentation in each of said legs being transversely curved, the radius of curvature of the indentation of one leg being significantly greater than that of the other leg.

2. A pin receptacle comprising a rolled sheet metal cylindrical barrel portion having overlapping sides for resiliently fitting in an aperture of a printed circuit board, one end of the barrel portion being flared to stop insertion of the receptacle in the board, a boss on the side of the barrel portion spaced from the flared end approximately the thickness of the circuit board, and a pair of opposed spring legs extending from the other end of said barrel portion and converging to a tip to grip a pin inserted through said barrel portion, said legs being transversely curved, the radius of curvature of one leg being significantly greater than that of the other leg.

References Cited by the Examiner

UNITED STATES PATENTS

| | | | |
|---|---|---|---|
| 740,358 | 9/03 | Esmond | 339—262 X |
| 1,188,024 | 6/16 | Treat | 339—191 |
| 1,704,515 | 3/29 | Rau | 339—220 |
| 1,769,325 | 7/30 | Warner | 339—258 X |
| 2,132,843 | 10/38 | Borden | 339—265 |
| 2,318,647 | 5/43 | White | 339—258 |
| 2,697,821 | 12/54 | Utz | 339—258 |
| 2,894,240 | 7/58 | Mautner | 339—221 X |

FOREIGN PATENTS

| | | |
|---|---|---|
| 789,332 | 1/58 | Great Britain. |

JOSEPH D. SEERS, *Primary Examiner.*